(12) United States Patent
Watanabe et al.

(10) Patent No.: US 11,236,468 B2
(45) Date of Patent: Feb. 1, 2022

(54) POROUS SHEET

(71) Applicant: TOKUSHU TOKAI PAPER CO., LTD, Shimada (JP)

(72) Inventors: Katsuhiko Watanabe, Shimada (JP); Masanori Imai, Shimada (JP)

(73) Assignee: TOKUSHU TOKAI PAPER CO., LTD, Shimada (JP)

( * ) Notice: Subject to any disclaimer, the term of this patent is extended or adjusted under 35 U.S.C. 154(b) by 47 days.

(21) Appl. No.: 16/087,519

(22) PCT Filed: Mar. 16, 2017

(86) PCT No.: PCT/JP2017/010662
§ 371 (c)(1),
(2) Date: Sep. 21, 2018

(87) PCT Pub. No.: WO2017/169848
PCT Pub. Date: Oct. 5, 2017

(65) Prior Publication Data
US 2019/0048528 A1    Feb. 14, 2019

(30) Foreign Application Priority Data

Mar. 31, 2016 (JP) .............................. JP2016-072964

(51) Int. Cl.
*D21H 11/18* (2006.01)
*B32B 5/26* (2006.01)
(Continued)

(52) U.S. Cl.
CPC ............... *D21H 11/18* (2013.01); *B32B 5/24* (2013.01); *B32B 5/26* (2013.01); *D21H 13/00* (2013.01);
(Continued)

(58) Field of Classification Search
CPC .......... H01G 11/52; H01G 9/02; D21H 11/18; D21H 13/24; D21H 15/02; D21H 13/08;
(Continued)

(56) References Cited

U.S. PATENT DOCUMENTS

2010/0316912 A1    12/2010  Hashimoto et al.
2012/0003525 A1    1/2012   Hashimoto et al.

FOREIGN PATENT DOCUMENTS

CN    103337603 A    10/2013
JP    10-214610 A    8/1998
(Continued)

OTHER PUBLICATIONS

Search Report for Swedish Application No. 1851139-4, dated Sep. 17, 2019.
(Continued)

*Primary Examiner* — Arun Ramaswamy
(74) *Attorney, Agent, or Firm* — Lathrop GPM LLP; Brian C. Trinque (57) ABSTRACT

The present invention relates to a porous sheet comprising cellulose fibers having an average fiber diameter ranging from 20 to 500 nm; cut fibers having an average fiber diameter ranging from 1.5 to 20 μm; and a hydrophilic polymer binder, wherein an amount of the cut fibers is 1% by weight or more and 80% by weight or less based on the total weight of the cellulose fibers and the cut fibers, and an amount of the hydrophilic polymer binder is 5 parts by weight or more and 30 parts by weight or less with respect to 100 parts by weight of the total weight of the cellulose fibers and the cut fibers. The porous sheet of the present invention can exhibit a superior strength (in particular, both tear strength and tensile strength), and exhibits a superior performance as a separator for an electrochemical device.

20 Claims, 1 Drawing Sheet (51) Int. Cl.
*H01G 9/02* (2006.01)
*H01G 11/52* (2013.01)
*D21H 15/02* (2006.01)
*D21H 13/08* (2006.01)
*D21H 13/00* (2006.01)
*D21H 21/18* (2006.01)
*B32B 5/24* (2006.01)
*D21H 13/26* (2006.01)
*H01M 50/44* (2021.01)
*H01M 50/409* (2021.01)
*H01M 50/411* (2021.01)
*H01M 50/429* (2021.01)
*D21H 13/24* (2006.01)
*H01M 50/449* (2021.01)
*B32B 5/02* (2006.01)
*B32B 5/08* (2006.01)
*B32B 7/12* (2006.01)

(52) U.S. Cl.
CPC ............. *D21H 13/08* (2013.01); *D21H 13/24* (2013.01); *D21H 13/26* (2013.01); *D21H 15/02* (2013.01); *D21H 21/18* (2013.01); *H01G 9/02* (2013.01); *H01G 11/52* (2013.01); *H01M 50/409* (2021.01); *H01M 50/411* (2021.01); *H01M 50/4295* (2021.01); *H01M 50/44* (2021.01); *B32B 5/022* (2013.01); *B32B 5/08* (2013.01); *B32B 7/12* (2013.01); *H01M 50/449* (2021.01); *Y02E 60/13* (2013.01)

(58) Field of Classification Search
CPC ........ D21H 13/00; D21H 21/18; D21H 13/26; H01M 2/16; H01M 50/44; H01M 50/409; H01M 50/411; H01M 50/4295; B32B 5/15; B32B 5/24
USPC .......................................... 361/502, 512, 503
See application file for complete search history.

(56) References Cited

FOREIGN PATENT DOCUMENTS

| | | |
|---|---|---|
| JP | 10-214610 A | 11/1998 |
| JP | 11-040130 A | 2/1999 |
| JP | 2010-219351 A | 9/2010 |
| JP | 2011-035373 A | 2/2011 |
| JP | 2012-142246 A | 7/2012 |
| JP | 2013-104142 A | 5/2013 |
| JP | 2013-206591 A | 10/2013 |
| JP | 2014-051767 A | 3/2014 |
| JP | 2014-060125 A | 4/2014 |
| JP | 2015-004140 A | 1/2015 |
| JP | 2015-084318 A | 4/2015 |
| JP | 2015-191871 A | 11/2015 |
| TW | 201327986 A1 | 7/2013 |
| TW | 201347274 A | 11/2013 |

OTHER PUBLICATIONS

International Search Report for PCT/JP2017/010662 dated May 30, 2017.
Office Action from TW 106109073 dated Dec. 5, 2017.

POROUS SHEET

This application is a 35 U.S.C. § 371 filing of International Application No. PCT/JP2017/010662, filed Mar. 16, 2017 which application claims priority to Japanese Patent Application No. 2016-072964 filed Mar. 31, 2016, which is incorporated by reference in its entirety.

TECHNICAL FIELD

The present invention relates to a porous sheet, and in particular, relates to a porous sheet suitable for a separator for an electrochemical device.

In the specification of the present application, an electrochemical device means an electrochemical device equipped with a positive electrode, a negative electrode, and a separator. As examples thereof, mention may be made of, for example, various types of secondary batteries such as a lithium ion secondary battery and a polymer lithium battery; various types of capacitors such as an aluminum electrolytic capacitor, an electrical double-layered capacitor and a lithium ion capacitor; and the like.

BACKGROUND ART

Recently, use of electricity as a source of energy has increased for addressing environmental problems related to $CO_2$ reduction, depletion of fossil fuel resources and the like. Therefore, for example, electric vehicles utilizing secondary batteries are being actively developed in the automobile industry. In addition, secondary batteries are featured also in view of efficient use of natural energy such as solar or wind energy.

In general, lithium ion secondary batteries are used as the secondary batteries for driving electric vehicles, at present, in view of the relationship between power and energy density. On the other hand, various companies have focused on the development of next-generation batteries in view of increased energy density, output, safety and the like. The next-generation batteries are in the fields with high future growth in the market.

In secondary batteries including lithium ion secondary batteries, primary batteries, capacitors (condensers) and the like, separators formed from paper, non-woven fabrics, porous films or the like are used. The performances required for the separators are, in general, short circuit protection between positive and negative electrodes, chemical stability with respect to electrolytic solutions, low inner resistivity and the like. The aforementioned requisite performances are universal ones required in separators regardless of types thereof, although they differ in degree in accordance with devices.

Separators of almost all lithium ion secondary batteries use porous membranes formed from a polymer organic compound such as polypropylene, polyethylene, or the like. The aforementioned porous membranes possess some characteristics suitable for lithium ion secondary batteries. For example, the following characteristics can be mentioned.

(1) Chemical stability with respect to electrolytic solutions is exhibited, and no fatal failures occur by separators.
(2) Thickness of a separator can be freely designed, and for this reason, separators responding to various demands can be provided.
(3) The diameter of pores can be designed to be reduced, and for this reason, superior lithium shielding properties are exhibited, and short circuit caused by lithium dendrite hardly occurs.
(4) When thermal runaway of lithium ion secondary batteries occurs, the initial thermal runaway can be controlled by melting polypropylene or polyethylene and thereby narrowing pores.

However, conventional research for lithium ion secondary batteries cannot identify an underlying cause of an occurrence of thermal runaway. Under present circumstances, various companies have studied and proposed a means for avoiding risks of thermal runaway with regard to various materials used in secondary batteries by empirical tools. Developments of materials suitable for vehicles having increased safety would be advanced in the future by clarifying the principle of thermal runaway and establishing a common evaluation method thereof, and if so, problems with respect to safety are expected to be overcome.

On the other hand, the second problem in secondary batteries for use in vehicles is cost. A separator is a material accounting for 20% of the battery cost, and further cost reduction is required under the present circumstances.

Next, in the field of rechargeable transportation units such as electric vehicles, and in the field of portable electronic terminals such as mobile phones, an electrical energy-storage device having an increased amount of storage electrical energy per unit volume is required in order to be operational for a long period of time even with a reduced volume. As an example of the aforementioned electrical energy-storage device, mention may be made of an electrical double-layered capacitor in which an electrolyte dissolved in an electrolytic solution is adsorbed by an electrode, and electrical energy is stored on the interface (electrical double layer) formed between the electrolyte and the electrode.

Main roles of separators in the electrical double-layered capacitors are short circuit protection of electrodes (separability), non-blocking movement of ions in the electrolytic solution (low inner resistivity), and the like. However, the aforementioned porous membranes have high density, and for this reason, the inner resistivity tends to increase. On the other hand, it is known that non-woven fabrics are used as a separator of a capacitor, but there are problems in that when a fiber diameter is reduced or a fiber density is increased in order to maintain separability, an inner resistivity increases. For this reason, development of a separator with a reduced inner resistivity is desirable. In addition, in order to increase the capacity of the electrical double-layered capacitor, it is necessary to increase the thickness of the electrode layer, and for this reason, it is required to reduce the thickness of the separator therefor.

There are two major processes for preparing polymer porous membranes of polypropylene, polyethylene or the like, namely a wet process and a dry process. The aforementioned preparation processes have respective characteristics. In the wet process, a plasticizer is added to a polymer such as polyethylene to form a film, subsequently, the film is biaxially drawn, the plasticizer is removed by cleaning with a solvent, and thereby, pores are provided. In this process, there are advantages in that pore size or film thickness can be superiorly adjusted, and response to various demands for all individual types of batteries can be carried out. On the other hand, there is a problem in that the preparation process is complicated, and for this reason, cost increases. In contrast, in the dry process, a polymer such as polyolefin is dissolved, the polymer is extruded on a film, the film with the polymer is subjected to annealing, the annealed film is drawn at a low temperature to form pores at the initial stage, and subsequently, drawing at a high temperature is carried out to form a porous product. In this process, there are advantages in that polymers having different melting points can be laminated, and the process is easy, and for this reason, the product can be produced at a reasonable cost. On the other hand, there is a problem in that sensitive adjustment of pores or thickness cannot be carried out.

A separator using non-woven fabrics formed from synthetic fibers, inorganic fibers or the like, other than the polymer porous films, has also been proposed. Conventional non-woven fabrics include dry types of non-woven fabrics and wet types of non-woven fabrics, and both of these have also been utilized as separators. It is believed that dry types of non-woven fabrics by which uniformity of fiber distribution cannot be obtained has a low effect of isolating electrodes, and for this reason, they cannot be used for lithium ion secondary batteries. On the other hand, wet types of non-woven fabrics have characteristics in that fiber distribution is uniform, as compared with dry types of non-woven fabrics. In addition, a higher porosity can be adjusted, as compared with porous films due to the characteristics of the preparation process, and for this reason, a sheet with reduced impedance can be produced. However, it is substantially difficult to use the dry types of non-woven fabrics in batteries using graphite negative electrodes which are widely applied to lithium ion secondary batteries at present. This is due to the characteristics of lithium ion secondary batteries which produce lithium dendrite at the negative electrode side. The aforementioned lithium dendrite has a property in which lithium dendrite is easily produced on the surface of a negative electrode which many lithium ions in a separator pass. For this reason, in non-woven fabrics in which roughness in a range with several dozen μm order is formed in the sheet itself, the parts at which lithium dendrite is easily formed are course. Therefore, shielding properties of controlling short circuit at the time of producing lithium dendrite may be reduced, as compared with a film type one. In addition, it is required to reduce the thickness of the separator as described above, but in particular, as the separator using the nonwoven fabric becomes thinner, the strength decreases. As a result, problems in safety such as a short circuit may occur, or there may be difficulties in the processability of the separator at the time of manufacturing the electric double-layered capacitor.

In order to overcome the aforementioned problems, specifying a pore size to a specified range is carried out, as described in Patent Document 1 (Japanese Unexamined Patent Application, First Publication No. H11-040130). However, the pore size depends on a fiber diameter. For this reason, the fiber diameter needs to be reduced in order to control the pore size to a small size. However, in the case of using fine fibers, strength is generally deteriorated.

PRIOR ART DOCUMENTS

Patent Documents

[Patent Document 1] Japanese Unexamined Patent Application, First Publication No. H11-040130

SUMMARY OF THE INVENTION

Problems to be Solved by the Invention

The present invention was made considering the aforementioned circumstances, and has an objective to provide a porous sheet exhibiting a superior strength (in particular, both tear strength and tensile strength), and exhibiting a superior performance as a separator for an electrochemical device.

Means for Solving the Problems

As a result of diligent studies in order to achieve the aforementioned objective, the present inventors discovered that a porous sheet containing a specific combination of a specific cellulose fiber, a specific cut fiber, and a specific binder has a superior strength (in particular, both tear strength and tensile strength), and exhibits a superior performance as a separator for an electrochemical device, thus completing the present invention.

The present invention relates to a porous sheet containing:
cellulose fibers having an average fiber diameter ranging from 20 to 500 nm,
cut fibers having an average fiber diameter ranging from 1.5 to 20 μm, and
a hydrophilic polymer binder,
wherein
an amount of the aforementioned cut fibers contained is 1% by weight or more and 80% by weight or less based on the total weight of the aforementioned cellulose fibers and the aforementioned cut fibers, and
an amount of the aforementioned hydrophilic polymer binder is 5 parts by weight or more and 30 parts by weight or less with respect to 100 parts by weight of the total weight of the aforementioned cellulose fibers and the aforementioned cut fibers. The term "average fiber diameter" used herein means an average fiber diameter obtained by magnification-observing a plurality of points on the surface of the porous sheet by means of an electron microscope, randomly selecting a predetermined number of fibers from each of the electron microscopic images, measuring the diameters of the selected fibers, and averaging the fiber diameters. The number of fibers to be screened is 100 or more, preferably 150 or more, more preferably 200 or more, and still more preferably 300 or more.

It is preferable that the aforementioned porous sheet has a specific tear strength of 15.0 mN·m$^2$/g or more.

It is preferable that the aforementioned porous sheet has a tensile strength exceeding 3.0 N/15 mm.

It is preferable that the aforementioned porous sheet has the Gurley permeability resistance per 10 μm of thickness of the porous sheet, which is 10 seconds or more and 200 seconds or less.

It is preferable that the aforementioned cellulose fibers contain fibers having a diameter of 400 nm or less in an amount of 50% by weight or more based on the total weight of the cellulose fibers.

It is preferable that the aforementioned cellulose fibers contain fibers having a diameter of 1 μm or more in an amount ranging from 5 to 40% by weight based on the total weight of the cellulose fibers.

It is preferable that the aforementioned cut fibers have an average fiber length of 10 mm or less.

It is preferable that the aforementioned cut fibers are selected from the group consisting of polyester fibers, aramid fibers, PPS resin fibers, regenerated cellulose fibers, vinylon fibers, and combinations thereof.

It is preferable that the aforementioned porous sheet has a porosity ranging from 30 to 70%.

It is preferable that the aforementioned porous sheet has a thickness ranging from 3 to 50 μm.

The porous sheet of the present invention can be further provided with a layer containing an inorganic filler on the at least one surface of the porous sheet.

The present invention also relates to a laminate containing the aforementioned porous sheet and a porous substrate (which is different from the porous sheet mentioned above).

It is preferable that the porous substrate include a woven fabric or a nonwoven fabric. In addition, it is preferable that the porous substrate include cellulose fibers.

It is preferable that the aforementioned porous sheet or the aforementioned laminate has a volume resistivity of 1,500 Ω·cm or less, which is determined by alternate current with a frequency of 20 kHz in the state in which the porous sheet or the laminate is impregnated with a 1 mol/LiPF$_6$/propylene carbonate solution.

The present invention also relates to a separator for an electrochemical device including the aforementioned porous sheet or the aforementioned laminate. Furthermore, the present invention also relates to an electrochemical device such as a battery, a capacitor, or the like, including the aforementioned separator for an electrochemical device.

Effects of the Invention

The porous sheet of the present invention is excellent in strength, and in particular, both tear strength and tensile strength, and in addition, the porous sheet is excellent in performance as a separator for an electrochemical device. In particular, the porous sheet of the present invention can exhibit both high tear strength and high tensile strength.

The porous sheet of the present invention contains fine cellulose fibers, and for this reason, it has superior blocking properties for lithium dendrite. In addition, the porous sheet of the present invention contains specific cut fibers, and for this reason, superior strength, and in particular, superior tear strength can be exhibited, even if the thickness is small. In addition, the porous sheet of the present invention contains a hydrophilic polymer binder, and for this reason, the uniformity of the fiber distribution can be further improved, and thereby, the blocking property of the lithium dendrite is further enhanced and the tensile strength can also be improved.

In addition, the laminate of the porous sheet and the porous substrate according to the present invention has an increased property of preventing short circuit as a whole, and exhibits superior performance as a separator for an electrochemical device, since for example, even in the case where the porous substrate is mainly composed of fibers having a relatively large diameter and a poor blocking property of lithium dendrite is exhibited by the porous substrate, per se, the porous sheet containing fine cellulose fibers and exhibiting superior blocking properties of lithium dendrite is laminated on the porous substrate.

Therefore, by using the porous sheet of the present invention or the laminate of the porous sheets and the porous substrate of the present invention, a separator for an electrochemical device having high lithium barrier properties which was difficult with conventional nonwoven fabrics, paper and the like, can be produced easily or at a low cost.

In addition, when the porous sheet mentioned above partially contains fibers with a relatively large diameter, the porous sheet and the laminate including the porous sheet and the porous substrate of the present invention can have further superior strength properties as a separator for an electrochemical device. In the laminate of the present invention, for example, even in the case where the physical properties of each of the porous substrate and the porous sheet tend to be deteriorated under a high temperature environment, the porous sheet and the porous substrate are laminated, and for this reason, thermal deterioration of the laminate as a whole can be reduced or avoided.

MODES FOR CARRYING OUT THE INVENTION

[Porous Sheet]

The porous sheet of the present invention contains: cellulose fibers having an average fiber diameter ranging from 20 to 500 nm,
cut fibers having an average fiber diameter ranging from 1.5 to 20 μm, and
a hydrophilic polymer binder,
wherein
an amount of the aforementioned cut fibers contained is 1% by weight or more and 80% by weight or less based on the total weight of the aforementioned cellulose fibers and the aforementioned cut fibers, and
an amount of the aforementioned hydrophilic polymer binder is 5 parts by weight or more and 30 parts by weight or less with respect to 100 parts by weight of the total weight of the aforementioned cellulose fibers and the aforementioned cut fibers.

The thickness of the porous sheet mentioned above is not particularly limited, and preferably ranges from 3 to 50 μm, preferably ranges from 5 to 40 μm, and more preferably ranges from 10 to 30 μm.

The porous sheet of the present invention can have the superior strength properties due to the aforementioned constitution. The porous sheet of the present invention can have a tensile strength of 2.0 N/15 mm or more and a specific tear strength of more than 10.0 mN·m$^2$/g. The specific tensile strength can be obtained, for example, by dividing the tensile strength measured according to JIS C2151 by the basis weight. The tensile strength is preferably more than 3.0 N/15 mm, more preferably 4.0 N/15 mm or more, and still more preferably 5.0 N/15 mm or more. On the other hand, the specific tear strength can be obtained, for example, by dividing the tear strength measured by a Trouser tearing method according to JIS K 7128-1 by the basis weight. The specific tear strength is preferably 15.0 mN·m$^2$/g or more, more preferably 20.0 mN·m$^2$/g or more, and still more preferably 25.0 mN·m$^2$/g or more.

In particular, the porous sheet of the present invention can have a superior tear strength. The relative superiority of the tear strength between different porous sheets can be qualitatively determined, for example, by pulling each porous sheet in the opposite direction and observing the presence or absence of breakage of the porous sheet at that time. It is preferable to cut a part of the porous sheet before the pulling operation in a direction different from the pulling direction, preferably in the vertical direction thereto. By cutting a part of the porous sheet, it is possible to qualitatively determine the relative superiority/inferiority of the tear strength of each porous sheet by observing the extent of growth of the cut, even if the porous sheet does not rupture.

The porosity of the porous sheet of the present invention preferably ranges from 30% to 70%. By maintaining the porosity in the range of 30% to 70%, the porous sheet of the present invention can be applied well to an electrochemical device. Even if the porosity is below 30%, the porous sheet of the present invention can act as an electrochemical device. However, output may reduce due to a high resistance value, and therefore, the sufficient performance as the electrochemical device may not be exhibited. On the other hand, if the porosity exceeds 70%, the mode diameter of the pore distribution increases, and resistance caused by the porous sheet reduces. For this reason, output performances of the electrochemical device and cycle characteristics can be improved. However, for use in lithium ion secondary batteries, lithium shielding properties may be reduced, and risk of occurrences of short circuit due to lithium dendrite may increase. Therefore, this may not be preferable in view of safety.

The porosity in the present invention can be calculated from the weight of the solvent absorbed in the porous sheet after the porous sheet is impregnated with the solvent by which the fibers are not swollen. More particularly, a sample prepared by cutting a porous sheet into a size of 50 mm×50 mm is moisturized for one day under an atmosphere of 23° C. and 50% relative humidity, and subsequently, a thickness of the sample is measured. In addition, the weight of the sample is also weighed by means of a scale defining a 4-digit or 5-digit number. After weighing the sample, the sample is impregnated with a solvent for one minute. Subsequently, the superfluous solvent present over the surface of the sample is removed with absorbent paper, and the weight of the sample is again weighed. A value obtained by subtracting the weight of the sample before impregnation with the solvent from the weight of the sample after impregnation with the solvent, is divided by the density of the solvent. Thereby, a volume of the solvent can be obtained. The obtained value of the volume is divided by the total volume calculated from the thickness, and then multiplied by 100 (%). The obtained value defines porosity. Therefore, the porosity in this case can be obtained from the following equation:

Porosity (%)=100×((weight of sheet after impregnation with solvent)−(weight of sheet before impregnation with solvent))/((density of solvent for use in impregnation)×5×5×(thickness) (cm))

A solvent which can be used in measuring a porosity in the present invention is a solvent by which fibers are not swollen. For this reason, an organic solvent having a low polarity is preferably used in the case of fibers having a polarity, such as cellulose fibers. In addition, the solvent should be selected from solvents which do not evaporate during a short period of time for the measurement. As examples of particularly preferable solvents, mention may be made of propylene glycol usually used in an electrolytic solution or a petroleum-based solvent having a high boiling point such as kerosene, and the like.

The porous sheet of the present invention has a volume resistivity, which is preferably 1500 Ω·cm or less, determined by alternate current with a frequency of 20 kHz in which the porous sheet is impregnated with a 1 mol/L solution of $LiPF_6$ dissolved in propylene carbonate. The volume resistivity correlates with the air permeability resistance mentioned below and the porosity mentioned above. Basically, as an air permeability resistance decreases and a porosity increases, a volume resistivity tends to reduce. A pore size and a pore distribution in the membrane also have effects on a volume resistivity. For this reason, a porous sheet with a decreased air permeability resistance and an increased porosity does not always exhibit a low volume resistivity. Here, the alternate current with a frequency of 20 kHz is utilized in order to remove an electrochemical element such as a reaction at the electrode interface from the measurement value of the volume resistivity. Thereby, only the total of the resistance of a measurement apparatus and the ion conduction of the porous sheet contributes to the measurement value. Therefore, the aforementioned measurement value can reflect the fine pore distribution and fine pore diameter of the porous sheet. In the porous sheet mentioned above, the aforementioned volume resistivity is preferably 1,500 Ω·cm or less, and more preferably 1,000 Ω·cm or less. When the volume resistivity exceeds 1,500 Ω·cm, the cycle characteristics may be degraded. When the volume resistivity is 1,500 Ω·cm or less, good cycle characteristics are exhibited. For this reason, the porous sheet of the present invention can be suitably used as a separator for an electrochemical device.

The measurement of the volume resistivity with the alternate current of 20 kHz in the present invention can be carried out in accordance with the following procedures. First, a porous sheet of the present invention punched in a size of 20 mm in diameter is dried for 24 hours or more at 150° C. Subsequently, five dried porous sheets of the present invention are placed in a stacking manner in a sample holder for a solid such as an SH2-Z model (manufactured by Toyo Corporation), and then impregnated sufficiently with an electrolytic solution of $LiPF_6$/propylene carbonate at the concentration of 1 mol/L. In addition, preferably, after the air remaining among porous sheet is deaerated under reduced pressure which is down to 0.8 MPa, the porous sheets are bookended between two faced gold electrodes, and alternating current impedance (Q) is measured by means of a frequency response analyzer VSP (manufactured by Bio-Logic) in which a potentio/galvanostat is combined under the conditions of a swept frequency ranging from 100 mHz to 1 MHz and an amplitude of 10 mV. A resistivity per unit volume (volume resistivity) is obtained from the aforementioned value and the measured thickness of the porous sheet of the present invention. It is preferable that only the resistance component, which the measurement apparatus has, be measured or be cancelled so as to non-reflect on the measurement results.

In the porous sheet of the present invention, a Gurley air permeability resistance per 10 μm of a thickness preferably ranges from 10 to 200 seconds (/100 cc), more preferably ranges from 15 to 100 seconds, and more preferably ranges from 20 to 50 seconds. The aforementioned air permeability resistance can be measured based on JIS P8117. When the aforementioned air permeability resistance is below 10 seconds, lithium shielding properties are reduced, and risk of occurrences of short circuit due to lithium dendrite may increase for use in lithium ion secondary batteries. Therefore, this is not preferable in view of safety. On the other hand, when the aforementioned air permeability resistance exceeds 200 seconds, the volume resistivity particularly increases, and output properties of the electrochemical device may be degraded. Therefore, this is not preferable.

In the porous sheet of the present invention, the average value of the fine pore diameter measured by means of a bubble point method may preferably range from 20 to 100 nm. The particle size of the electrode active material used in an electrochemical device such as a lithium ion battery varies. For this reason, the fine pore diameter does not have to be always small. In accordance with an approximate criterion, if the fine pore diameter is ¼ of the particle size of the active material used, short circuit may not occur.

(Cellulose Fibers)

The porous sheet of the present invention contains cellulose fibers having an average fiber diameter (thickness) ranging from 20 to 500 nm. The porous sheet may partially contain cellulose fibers having an average fiber diameter of less than 20 nm, and the amount thereof is preferably less than 20% by weight, more preferably less than 10% by weight, and still more preferably less than 5% by weight, based on the total weight of the cellulose fibers. The porous sheet mentioned above may partially contain cellulose fibers having an average fiber diameter of more than 500 nm, and the amount thereof is preferably less than 30% by weight, more preferably less than 20% by weight, and still more preferably less than 10% by weight, based on the total weight of the cellulose fibers. The average fiber diameter of the cellulose fibers preferably ranges from 50 to 450 nm, more preferably ranges from 100 to 400 nm, still more preferably ranges from 150 to 380 nm, and still more preferably ranges from 200 to 360 nm.

The aforementioned cellulose fibers are preferably constituted from cellulose. That is, in the aforementioned cellulose fibers, the polymer material constituting the fibers preferably consists of only cellulose.

Cellulose fibers can be uniformly dispersed in water by virtue of hydroxyl groups which cellulose molecules have, and the viscosity of the slurry depends on the fiber length and surface area of the cellulose fibers. If cellulose fibers are thinner, the surface area of the cellulose increases, and for this reason, the viscosity of the slurry naturally increases. In addition, as the fiber length becomes longer, interaction among fibers increases. It is believed that this may also be a factor of increasing the viscosity. The increase of viscosity due to the aforementioned interactions is a factor of inhibiting formation of a sheet at a high concentration. In the case of using nanocellulose, reducing a concentration is generally carried out.

In addition, cellulose fibers have a property in which fibers are hydrogen-bonded during the dehydration step by virtue of the hydroxyl groups thereof. This feature cannot be observed in non-woven fabrics prepared with synthetic fibers other than regenerated cellulose. Through the aforementioned step of formation of hydrogen bonds, strength is exhibited. On the other hand, shrinkage of cellulose fibers during a drying step due to interactions among fibers is larger than that of non-woven fabrics using synthetic fibers. In particular, as the diameter of fibers becomes thinner, stiffness of the fibers reduces. For this reason, the aforementioned shrinkage is remarkably observed. In addition, it is known that in a sheet prepared using fibers in which fibrillation extremely proceeds, the fibers completely adhere, and for this reason, transparency occurs. Namely, it is difficult to control a pore diameter or produce a porous sheet only by reducing the fiber diameter (thickness). For this reason, control of shrinkage during drying and inhibition of hydrogen bonding among fibers are needed in the production of the porous sheet. Conventional methods specifically propose that raw materials subjected to a sheet formation by means of a papermaking method or a casting method are dried after replacing the solvent in the raw materials with a hydrophilic solvent such as acetone, and subsequently, replacing the hydrophilic solvent with a more hydrophobic solvent such as a solvent mixture of toluene and acetone. However, the aforementioned methods have two problems. The first problem is the operation of solvent replacement of water as a dispersion solvent with acetone. Cellulose fibers exhibit an increased property of maintaining water as the fiber diameter is reduced. For this reason, the replacement of water with the solvent is extremely slow work and is a factor of reducing productivity in view of practical production. In addition, the pore diameter depends on the diameter of the fibers, and for this reason, the pore diameter is consistently controlled by the diameter (thickness) of the fibers. Therefore, if uniform fibers are not utilized, the desirable pore diameter cannot be obtained. The step of treating cellulose fibers also requires cost and time.

The cellulose fibers usable in the present invention (not only in the porous sheet, but also in the porous substrate) are not limited by types of cellulose such as cellulose I, cellulose II, or the like. Natural fibers of cellulose I from cellulose fiber sources represented by cotton, cotton linter, or wood pulp are preferable. Fibers of cellulose II represented by regenerated cellulose have a lower degree of crystallization, as compared with fibers of cellulose I, and tend to form short fibers at the time of subjecting to a fibrillation treatment. Therefore, cellulose II is not preferable.

The cellulose fibers for use in the porous sheet may be subjected to microfibrillation. An apparatus for microfibrillation treatment of cellulose fibers is not particularly limited. As examples thereof, mention may be made of, for example, a homogenizer such as a high pressure homogenizer (e.g., high pressure dispersing treatment by a Manton-Gaulin disperser), a Ranie type pressure homogenizer, an ultrahigh pressure homogenizer (Altimizer (trademark) (manufactured by Sugino Machine Co., Ltd.), a dispersion apparatus such as a bead mill or a planetary mill, a mass colloider (abrasive grain plate apparatus for grinding in which several abrasive plates provided with abrasive grains having a grain size ranging from No. 16 to No. 120 are arranged for grinding, manufactured by Masuko Sangyo Co., Ltd.) or the like. In addition, a refiner used for papermaking such as a double disk refiner or a beater can also be used for pretreatment before the microfibrillation treatment is carried out. In addition, cellulose nanofibers obtained by forming nanofibers by means of a TEMPO oxidation catalyst can also be used although the blending amount thereof may be limited. In particular, in the present invention, the cellulose fibers for use in the porous sheet are preferably subjected to a pretreatment of a microfibrillation treatment of passing a pulp slurry previously subjected to a refining treatment through a grinding part of an abrasive grain plate apparatus for grinding in which several abrasive plates provided with abrasive grains having a grain size ranging from No. 16 to No. 120 are arranged for grinding; or a pretreatment of a microfibrillation treatment of subjecting a pulp slurry previously subjected to a refining treatment, to a treatment with a high pressure homogenizer.

The aforementioned cellulose fibers preferably contain fibers having a diameter (thickness) of 400 nm or less, preferably 350 nm or less, and more preferably 300 nm or less, in an amount of preferably 50% by weight or more, more preferably 60% by weight or more, still more preferably 70% by weight or more, still more preferably 80% by weight or more, and particularly preferably 90% by weight or more, based on the total weight of the cellulose fibers. Therefore, it is preferable that the cellulose fibers mentioned above are mainly constituted by relatively thin cellulose fibers having a diameter of 400 nm or less.

The aforementioned cellulose fibers are preferably a mixture in which cellulose fibers having an average fiber diameter preferably ranging from 20 to 400 nm, more preferably ranging from 60 to 350 nm, and still more preferably ranging from 100 to 300 nm, and cellulose fibers having an average fiber diameter preferably exceeding 400 nm and up to 500 nm, more preferably ranging from 420 to 490 nm, and still more preferably ranging from 440 to 480 nm, are mixed in a mass ratio preferably ranging from 99:1 to 60:40, more preferably ranging from 95:5 to 70:30, and still more preferably ranging from 90:10 to 80:20.

The aforementioned cellulose fibers may contain thick fibers having a diameter (thickness) of 1 μm or more in an amount of preferably 5% by weight or more, more preferably 10% by weight or more, still more preferably 15% by weight or more, still more preferably 20% by weight or more, and particularly preferably 25% by weight or more, with respect to the total weight of the cellulose fibers. The diameter of the thick fiber may exceed 1 µm, for example 1.5 µm or more, or 2.0 µm or more. In particular, in the preparation process of the present invention described below, casting application is carried out, and for this reason, it is difficult to prepare and use a slurry only with thin cellulose fibers having a fiber diameter of less than 1 µm which may cause an extremely high viscosity of the slurry. In addition, in order to make it applicable, the concentration of the slurry must be reduced, and thereby, a cost for drying a solvent and the like used therefor increases, which is not economical. In addition, if polymer thin fibers having a reduced fiber diameter are produced by exerting shearing force to the fibers by a general method, the length of fibers also tends to be reduced. Therefore, a tear strength of the prepared sheet tends to be reduced. For this reason, the tear strength of the prepared sheet can be improved by means of the presence of fibers having a diameter of 1 µm or more in an amount of 5% by weight or more.

On the other hand, the blending amount of the thick cellulose fibers having a diameter of 1 µm or more in the total weight of the cellulose fibers is preferably 40% by weight or less, more preferably 35% by weight or less, and still more preferably 30% by weight or less. If the thick cellulose fibers having a diameter of 1 µm or more are present in an amount exceeding 40% by weight, the number of contact points of individual cellulose fibers via hydrogen bonds is reduced. For this reason, the tensile strength may be reduced, and this is not preferable. By setting the amount of the fibers having a diameter of 1 µm or more to the range of 5% by weight or more and 40% by weight or less, both the tensile strength and the tear strength can be more balanced.

The proportion of the cellulose fibers in the all fibers constituting the porous sheet preferably ranges from 1 to 50% by weight, more preferably ranges from 5 to 45% by weight, still more preferably from 10 to 40% by weight, still more preferably 15 to 35% by weight, and particularly preferably 20 to 30% by weight, based on the weight of all fibers including the cut fibers described below.

(Cut Fibers)

The porous sheet of the present invention contains cut fibers having an average fiber diameter (thickness) ranging from 1.5 to 20 µm. Cut fibers having an average fiber diameter of less than 1.5 µm may be partially contained therein, and the blending amount thereof is preferably less than 20% by weight, more preferably less than 10% by weight, and still more preferably less than 5% by weight, based on the total weight of the cut fibers. In addition, the porous sheet of the present invention may partially contain cut fibers having an average fiber diameter of more than 20 µm, and the blending amount thereof is preferably less than 30% by weight, more preferably less than 20% by weight, and still more preferably less than 10% by weight, based on the total weight of the cut fibers. The average fiber diameter of the cut fibers preferably ranges from 1.5 to 18 µm, more preferably ranges from 2 to 16 µm, still more preferably ranges from 2.5 to 14 µm, still more preferably ranges from 3.0 to 12 µm, and particularly preferably ranges from 3.5 to 10 µm.

In the cut fibers mentioned above, a polymer selected from polyvinyl alcohol, aliphatic polyamide, semi-aromatic polyamide, aromatic polyamide, polysulfone, cellulose acetate, cellulose, polyethylene, polypropylene, polyester, polyvinylidene fluoride, polyvinylidene fluoride-hexafluoropropylene, polyethylene oxide, polymethylpentene, polyacrylonitrile polyphenylene sulfide, polyacetyl, polyurethane, polyacrylonitrile, polymethyl methacrylate, polystyrene, polytetrafluoroethylene, ethylene-tetrafluoroethylene, PPS resin, regenerated cellulose, and mixtures thereof can be utilized.

The cut fibers mentioned above are preferably formed from the polymer mentioned above. That is, it is preferable that the cut fibers be formed from only the polymer mentioned above.

As the polymer constituting the cut fibers mentioned above, polyester, aramid, vinylon, PPS resin, regenerated cellulose, or a combination thereof is preferable.

As examples of polyesters, mention may be made of, for example, polyethylene terephthalate, polypropylene terephthalate, polytrimethylene terephthalate, polybutylene terephthalate, polyethylene naphthalate, or a combination thereof. Polyethylene terephthalate, polybutylene terephthalate, polyethylene naphthalate, and a combination thereof are preferable.

Aramid means an aromatic polyamide. In the present invention, the term "aramid" means a linear polymer compound having a chemical structure in which 60% by mol or more, preferably 70% by mol or more, more preferably 80% by mol or more, and still more preferably 90% by mol or more of the amide bonds are directly bonded to the aromatic ring.

Aramid is classified into a para-aramid, a meta-aramid and a copolymer thereof, depending on the substitution position of an amide group to a benzene ring. As examples of para-aramids, mention may be made of polyparaphenylene terephthalamide and a copolymer thereof, poly(paraphenylene)-copoly(3,4'-diphenyl ether) terephthalamide, and the like. As examples of meta-aramids, polymetaphenylene isophthalamide and a copolymer thereof, and the like may be mentioned. These aramids are industrially produced by, for example, a conventionally known interfacial polymerization method, a solution polymerization method, or the like, and can be obtained as commercial products, but are not limited thereto.

Vinylon means a polyvinyl alcohol. As the polyvinyl alcohol, a heat-meltable PVA-based resin is preferable, and it can be obtained by saponifying a polymer of vinyl esters. As examples of vinyl esters, mention may be made of vinyl formate, vinyl acetate, vinyl propionate, vinyl pivalate and the like, and vinyl acetate is industrially used in many cases. PVA may contain an α-olefin unit. They are those having 4 or less carbon atoms, such as ethylene, propylene, 1-butene, isobutene and the like, and ethylene is more preferable in consideration of strength properties and form stability. The content of the α-olefin unit ranges from 1 to 20% by mol. If the content is more than 20% by mol, the solubility of the modified PVA in water may decrease.

PPS resin has a structure in which benzene rings and sulfur are alternately connected and extended, and exhibits high heat resistance, strength and chemical resistance. As representative examples of PPS resins, mention may be made of polyphenylene sulfide, polyphenylene sulfide sulfone, polyphenylene sulfide ketone, a random copolymer thereof, a block copolymer thereof, a mixture thereof, and the like. As PPS fibers, a plurality of products such as "TORCON" (manufactured by Toray Industries, Inc.), "PROCON" (manufactured by Toyobo Co., Ltd.), and the like are commercially available.

Regenerated cellulose fiber is a fiber produced by dissolving cellulose or a derivative thereof once to form a solution and spinning it into a fibrous form. As examples of products industrially used, mention may be made of rayon (produced by dissolving in alkali and carbon disulfide to form a viscose, and spinning in acid), lyocell (produced by dissolving in N-methylmorpholine N-oxide), acetate (produced from cellulose acetate), and the like.

As the polymer constituting the cut fibers, polyester is preferable, and polyethylene terephthalate, polypropylene terephthalate, polytrimethylene terephthalate, polybutylene terephthalate, polyethylene naphthalate, or a combination thereof is more preferable. In addition, polyethylene terephthalate, polybutylene terephthalate, Polyethylene naphthalate, and a combination thereof are still even more preferred.

The fiber length of the cut fibers preferably ranges from 1 to 10 mm, more preferably ranges from 2 to 8 mm, and still more preferably ranges from 3 to 5 mm. If the fiber length is below 1 mm, the effect of improving the strength due to the cut fibers may markedly deteriorate. On the other hand, if the fiber length exceeds 10 mm, the cut fibers may be entangled with each other. Thereby, the texture of the sheet may be remarkably deteriorated, and it may be difficult to obtain a uniform porous sheet.

The proportion of the cut fibers in all the fibers (including the aforementioned cellulose fibers) constituting the porous sheet is 80% by weight or less, may be 50% by weight or less, and may be 30% by weight or less, based on the weight of all the fibers. The proportion of the cut fibers in all the fibers constituting the porous sheet is 1% by weight or more, preferably 3% by weight or more, and more preferably 5% by weight or more, based on the weight of the whole fibers. The proportion of the cut fibers in all the fibers constituting the porous sheet, for example, preferably ranges from 50 to 99% by weight, more preferably ranges from 55 to 95% by weight, still more preferably ranges from 60 to 90% by weight, still more preferably ranges from 65 to 85% by weight, and in particular, preferably ranges from 70 to 80% by weight. If the addition amount of the cut fibers exceeds 80% by weight, the frequency of entanglement of the cut fibers in the dispersion liquid is increased, so that the obtained sheet becomes flocked, the texture thereof is markedly deteriorated, and it is difficult to obtain a uniform porous sheet. In addition, if the amount of cut fibers added is below 1% by weight, the improvement of strength (particularly tear strength) is insufficient.

In the case where the proportion of the cut fibers in all the fibers (including the cellulose fibers mentioned above) constituting the porous sheet exceeds 50% by weight based on the weight of all the fibers, the porous sheet of the present invention can be, for example, in the form of a nonwoven fabric mainly formed from the cut fibers mentioned above.

(Hydrophilic Polymer Binder)

The porous sheet of the present invention contains at least one hydrophilic polymer binder. The hydrophilic polymer binder used in the present invention is used as an adhesive for linking the fibers. The hydrophilic polymer binder can exhibit a function of improving the dispersibility of the fibers, in addition to the function as an adhesive. In order to obtain a uniform pore distribution, it is necessary to uniformly disperse the fibers in the slurry used for manufacturing the porous sheet. The binder has a role like a protective colloid, by being fixed on the surface of the fibers, and therefore, the dispersibility is improved.

It is preferable that the hydrophilic polymer contained in the hydrophilic polymer binder have a carboxy group and/or a hydroxyl group. The hydrophilic polymer binder containing a hydrophilic polymer, and preferably a hydrophilic polymer containing a carboxy group and/or a hydroxyl group, may be in the form of a solution or in the form of an emulsion. As the hydrophilic polymer, a cellulose derivative such as carboxymethylcellulose, hydroxyethylcellulose, hydroxypropylcellulose, hydroxypropylmethylcellulose, or hydroxyalkylcellulose; a polysaccharide derivative such as alginic acid, amphoteric starch, carboxyl-modified starch, phosphoric esterified starch, or corn starch; a polyacrylic acid; a polyvinyl alcohol; a carboxy group-modified polyvinyl alcohol; and the like can be utilized, but it is not limited thereto. In particular, carboxymethylcellulose is preferably usable, since carboxymethylcellulose has a skeleton in which glucose residues are linked by $\beta$-1,4 glycoside bonds like cellulose, and therefore it is considered that the affinity between these compounds is high when they are mixed.

The hydrophilic polymer mentioned above may be crosslinked. The crosslinking may be formed by self-crosslinking of the hydrophilic polymer, or may be formed by separately adding a crosslinking agent. By forming crosslinks in the porous sheet, movement of molecules due to heat is restricted. For this reason, the thermal stability, mechanical properties, and the like of the porous sheet can be enhanced.

The crosslinking may be formed only between molecules of the hydrophilic polymer, or may be formed between the hydrophilic polymer and the fiber. In particular, in the case where a crosslinked structure is formed between the hydrophilic polymer and the fiber, the interaction between the fibers is strengthened, and thereby, linking is formed. Therefore, there is an effect of enhancing the strength of the sheet, and for this reason, this is preferable.

The type of the crosslinking agent which crosslinks between the hydrophilic polymers, and in some cases, between the hydrophilic polymer and the fiber, is not particularly limited. A urea formaldehyde resin, a melamine formaldehyde resin, a carbodiimide group-containing compound, an oxazoline group-containing compound, a glyoxal group-containing compound, an isocyanate group-containing compound, and the like can be used. In particular, when the crosslinking agent is a polymer compound having a plurality of crosslinking points, a crosslinked structure containing more molecules and/or fibers can be formed. For this reason, this is preferable. As described above, the crosslinking agent is preferably a polymer compound. This is also because the presence of a long molecular chain between the crosslinking points of the crosslinking agent makes it possible for molecules to have room for movement at the time of exerting stress, and for this reason, it is possible to further maintain the elongation of the sheet, as compared with use of a crosslinking agent with a low molecular weight.

The usage amount of the hydrophilic polymer binder mentioned above ranges from 5 to 30 parts by weight, preferably ranges from 7 to 25 parts by weight, more preferably ranges from 9 to 20 parts by weight, and still more preferably ranges from 10 to 15 parts by weight, based on 100 parts by weight of the total amount of the cellulose fibers and the cut fibers. If the addition amount of the hydrophilic polymer binder is below 5 parts by weight, the strength of the resultant sheet may be reduced and the dispersibility of the fibers may be deteriorated, so that it may become difficult to obtain uniform pores. On the other hand, if the amount exceeds 30 parts by weight, the binder may fill the pores, and the volume resistivity of the porous sheet may be increased. For this reason, it is not preferable.

The hydrophilic polymer binder can be constituted by a hydrophilic polymer and a medium. As examples of media, mention may be made of, for example, water, various organic solvents such as alcohol, or a combination thereof. Water is preferable. The hydrophilic polymer binder can contain the hydrophilic polymer in an amount ranging from 0.1 to 10% by weight, preferably ranging from 0.5 to 5% by weight, more preferably ranging from 0.8 to 2% by weight, and still more preferable being about 1.0% by weight, based on the total weight of the hydrophilic polymer binder.

[Laminate]

A laminate of a porous sheet and a porous substrate of the present invention contains a porous substrate and the porous sheet mentioned above.

The laminate of the present invention comprises at least two layers of the aforementioned porous substrate and the aforementioned porous sheet. The laminate of the present invention may contain a layer or layers other than the porous substrate and the porous sheet mentioned above. It is preferable that the porous substrate and the porous sheet be laminated by directly contacting with each other. In addition, the aforementioned porous substrate and the aforementioned porous sheet may be simply laminated in contact with each other, but they are preferably integrated.

The porosity of the laminate of the present invention preferably ranges from 30 to 70%. The porosity can be measured as described above. By maintaining the porosity of the laminate of the present invention in the range of from 30% to 70%, the laminate can be well applied to an electrochemical device.

The laminate of the present invention has a volume resistivity measured using an alternating current of 20 kHz in a state in which the laminate is impregnated with a propylene carbonate solution of $LiPF_6$ at a concentration of 1 mol/L, the volume resistivity preferably being 1,500 Ω·cm or less. The volume resistivity can be measured as described above. The volume resistivity of the laminate is more preferably 1,000 Ω·cm or less.

The laminate of the present invention has an air permeability resistance per 10 μm of thickness, which preferably ranges from 10 to 600 seconds (/100 cc), more preferably ranges from 20 to 450 seconds, and still more preferably ranges from 30 to 250 seconds. The air permeability resistance can be measured based on JIS P 8117.

Regarding the laminate of the present invention, the average value of the fine pore diameters measured by the bubble point method preferably ranges from 2 to 10 μm for the aforementioned porous substrate and ranges from 20 to 100 nm for the aforementioned porous sheet.

The surface roughness of the laminate of the present invention is preferably 1.5 or less on both the front and back surfaces.

(Porous Substrate)

The shape of the porous substrate is not particularly limited, but having the form of a sheet is preferable. Thus, the porous substrate may be a porous sheet different from the porous sheet described above, or may be the same porous sheet as the aforementioned porous sheet. The porous substrate is preferably a porous sheet different from the porous sheet described above.

The porous substrate mentioned above preferably contains polymer fibers having an average fiber diameter (thickness) ranging from 2 to 20 μm. The aforementioned porous substrate may partially contain polymer fibers having an average fiber diameter of less than 2 μm, and the blending amount thereof is preferably less than 20% by weight, more preferably less than 10% by weight, and still more preferably less than 5% by weight, based on the total weight of the porous substrate. Therefore, the porous substrate mentioned above is preferably composed mainly of relatively thick fibers, as compared with the cellulose fibers mentioned above. The porous substrate may partially contain polymer fibers having an average fiber diameter exceeding 20 μm, and the blending amount thereof is preferably less than 30% by weight, more preferably less than 20% by weight, and still more preferably less than 10% by weight, based on the total weight of the porous substrate.

The porous substrate mentioned above may be composed of a woven fabric or a nonwoven fabric, and it is preferably composed of a nonwoven fabric from the viewpoint of simplicity of the preparation method and the like.

The material of the fibers constituting the porous substrate mentioned above is not particularly limited. As examples thereof, mention may be made of, for example, organic materials such as cellulose, cellulose derivatives (carboxymethyl cellulose and the like), polypropylene (PP), polyester [polyethylene terephthalate (PET), polyethylene naphthalate (PEN), polybutylene terephthalate (PBT), and the like], polyacrylonitrile (PAN), polyaramid, polyamideimide, polyimide, and polyvinyl alcohol (PVA); inorganic materials (inorganic oxides) such as glass, alumina, and silica; and the like. The constituent fibers of the porous substrate mentioned above may contain one type of these materials or may contain two or more types thereof. In addition to the materials mentioned above, the constituent fibers of the porous substrate may contain, if necessary, various known additives (for example, an antioxidant or the like in the case of the material mentioned above being a resin).

It is preferable that the porous substrate mentioned above comprise cellulose fibers.

The average fiber diameter of the constituent fibers of the porous substrate preferably ranges from 3 to 18 μm, more preferably ranges from 4 to 15 μm, and still more preferably ranges from 5 to 10 μm. If the average fiber diameter is too large, the thickness of the laminate may be increased, resulting in difficulty in handling. On the other hand, if the diameter is too small, the voids of the laminate may be too small and the ion permeability may tend to be decreased. In addition, when the laminate is used as a separator, the load characteristics of the battery may be deteriorated.

The thickness of the porous substrate in the case of the porous substrate being in the form of a sheet is not particularly limited, and preferably ranges from 1 to 60 μm, more preferably ranges from 2 to 50 μm, more preferably ranges from 3 to 40 μm, and still more preferably ranges from 5 to 30 μm.

(Inorganic Filler Layer)

On at least one surface of the porous sheet of the present invention, a layer comprising inorganic fillers (inorganic filler layer) can be further provided. By providing the inorganic filler layer, in the case of the porous sheet of the present invention being used, for example, as a separator for a battery, direct contact between the electrode and the porous sheet can be prevented. When the charging voltage of the battery is increased, the oxidizing/reducing power of the electrode surface is increased. For this reason, an organic substance (for example, a porous sheet) in direct contact therewith may be deteriorated. Therefore, if the inorganic filler layer is provided on the surface of the porous sheet, deterioration of the porous sheet can be suppressed.

The thickness of the inorganic filler layer is not particularly limited. The thickness can range, for example, from 1 to 10 μm, and preferably ranges from about 2 to 4 μm. The inorganic filler layer has almost no influence on the strength properties and the air permeability resistance of the porous sheet.

The inorganic filler layer is preferably formed from inorganic fillers and a binder resin, and more preferably contains inorganic fillers as a main component. The content ratio of the inorganic fillers with respect to the total weight of the inorganic fillers and the binder resin preferably ranges from 50 to 99% by weight, more preferably ranges from 60 to 97% by weight, and still more preferably ranges from 70 to 95% by weight. As the inorganic filler, alumina such as α-alumina, β-alumina, γ-alumina or the like, alumina hydrate such as boehmite, magnesium oxide, calcium oxide or the like can be used. Among these, α-alumina or alumina hydrate is preferably used from the viewpoint of high stability to an electrolyte used for a lithium ion battery. As the binder resin, various types of synthetic resins such as styrene-butadiene resin, acrylic ester resin, methacrylic ester resin, fluorine resin such as polyvinylidene fluoride, and the like can be used.

The inorganic filler layer mentioned above can be formed by applying a coating liquid prepared by dispersing, for example, inorganic fillers and a binder resin in an appropriate type of solvent on at least one surface of the porous sheet, and then drying. The coating liquid can contain, in addition to the inorganic fillers and the binder resin mentioned above, various types of additives such as various dispersants such as polyacrylic acid and carboxymethylcellulose sodium, various thickeners such as hydroxyethylcellulose, carboxymethylcellulose sodium, and polyethylene oxide, various wetting agents, preservatives, and antifoaming agents, as required.

[Preparation Method]

The porous sheet of the present invention can be prepared by applying a slurry on a substrate, and then drying, wherein the slurry includes, for example, cellulose fibers having an average fiber diameter ranging from 20 to 500 nm, cut fibers having an average fiber diameter of 1.5 to 20 μm, and a hydrophilic polymer binder, in which the amount of the cut fibers contained therein ranges from 1 to 80% by weight based on the total weight of the cellulose fibers and the cut fibers, and the amount of the hydrophilic polymer binder ranges from 5 to 30 parts by weight based on 100 parts by weight of the total weight of the cellulose fibers and the cut fibers. The concentration of the fibers in the slurry is not limited, and may range, for example, from 1 to 40% by weight, preferably ranges from 5 to 30% by weight, and more preferably ranges from 10 to 20% by weight.

Specifically, the porous sheet of the present invention can be obtained by means of the preparation method containing at least steps of applying the slurry mentioned above onto a substrate, drying the slurry to form a sheet on the substrate, and peeling the sheet from the substrate to obtain a porous sheet.

The aforementioned slurry preferably contains a hydrophilic pore former. As a means for making a sheet formed from fibers porous, a slurry including a hydrophilic pore former can be applied onto a substrate, followed by drying. Thereby, production efficiency can be greatly improved. In addition, in the present invention, solubility of the hydrophilic pore former with respect to water is adjusted, and thereby, a pore size of the sheet can be controlled. In addition, in the present invention, the blending amount of the hydrophilic pore former is adjusted, and thereby, porosity can be freely controlled. For example, in the present invention, the hydrophilic pore former can be used in an amount preferably ranging from 50 to 600 parts by weight, more preferably ranging from 80 to 400 parts by weight, and further preferably ranging from 100 to 300 parts by weight, with respect to 100 parts by weight (mass) of the total of the cellulose fibers and the cut fibers.

The hydrophilic pore former which may be used in the present invention is not particularly limited as long as it is a hydrophilic substance which can form pores in the sheet formed from fibers. The boiling point of the hydrophilic pore former is preferably 180° C. or more. In the case where the aforementioned fibers can carry out hydrogen bonding in the same manner as cellulose fibers, it is known that hydrogen bonding among the fibers occurs when the moisture of the sheet ranges from 10 to 20% by weight during drying. At the time of forming the aforementioned hydrogen bonds, if the pore former is present in the sheet, the hydrogen bonding among fibers is inhibited. Thereby, a porous sheet can be produced. In the case of using a pore former having a boiling point of less than 180° C., the pore former evaporates during the drying step even if the blending amount thereof is increased, and sufficient formation of a porous sheet may not be carried out. For this reason, a pore former having a boiling point of 180° C. or more is preferable. The pore former preferably has a boiling point of 200° C. or more. A primary alcohol or the like having a molecular weight which is less than that of hexanol is a material having both water solubility and hydrophobic properties. However, such a material easily evaporates as compared with water during the drying step, and for this reason, hydrogen bonding cannot be sufficiently inhibited. Therefore, it cannot be used for the present invention. With the proviso of using a drying method under specific conditions different from the usual drying conditions, such as drying with the air filled with vapor of the pore former, or using multi-stage drying with a solvent having a lower vapor pressure than that of water, the pore former does not necessarily have a boiling point of 180° C. or more.

The hydrophilic pore former used in the present invention has a solubility with respect to water which is preferably 10% by weight or more, more preferably 20% by weight or more, and further more preferably 30% by weight or more. In the case of using a pore former having a solubility with respect to water of less than 10% by weight, the blending amount of the pore former is limited. For this reason, it may be difficult to control the desirable porosity only by the blending amount of the pore former. In addition, as drying proceeds, the amount of the solvent reduces, and thereby, the pore former which cannot be dissolved is separated. For this reason, it may be difficult to uniformly form pores in the face direction and the thickness direction of the sheet. The aforementioned hydrophobic pore former may be emulsified with an emulsifier or the like, and thereby, pores can be formed uniformly to some extent. However, it is difficult to control the pore diameter. On the other hand, in the case of using a pore former having a solubility with respect to water of 10% by weight or more, the pore former can be uniformly dispersed in the slurry, and as a high solubility with respect to water is exhibited, separation does not occur during the drying step. For this reason, by uniformly inhibiting hydrogen bonding in the drying step, pores can be uniformly produced.

The hydrophilic pore former used in the present invention has a vapor pressure at 25° C. which is preferably less than 0.1 kPa, more preferably less than 0.09 kPa, and further more preferably less than 0.08 kPa. A hydrophilic pore former having a vapor pressure of 0.1 kPa or more has an increased volatility. For this reason, such a hydrophilic pore former highly tends to vaporize before the pore former contributes to form pores for a membrane. As a result, it may be difficult to obtain a fine porous membrane.

The hydrophilic pore former used in the present invention has a water-octanol partition coefficient (Log Pow) preferably ranging from −1.2 to 0.8, more preferably ranging from −1.1 to 0.8, and further more preferably ranging from −0.7 to 0.4. As the aforementioned octanol, n-octanol is preferable. If a hydrophilic pore former having the aforementioned partition coefficient of less than −1.2 is used, an impedance value of the obtained porous sheet may increase.

As examples of hydrophilic pore formers which can be used in the present invention, mention may be made of, for example, a higher alcohol such as 1,5-pentanediol, 1-methylamino-2,3-propanediol, or the like; a lactone such as ε-caprolactone, α-acetyl-γ-butyrolactone, or the like; a glycol such as diethylene glycol, 1,3-butylene glycol, propylene glycol, or the like; and a glycol ether such as triethylene glycol dimethyl ether, tripropylene glycol dimethyl ether, diethylene glycol monobutyl ether, triethylene glycol monomethyl ether, triethylene glycol butyl methyl ether, tetraethylene glycol dimethyl ether, diethylene glycol monoethyl ether acetate, diethylene glycol monoethyl ether, triethylene glycol monobutyl ether, tetraethylene glycol monobutyl ether, dipropylene glycol monomethyl ether, diethylene glycol monomethyl ether, diethylene glycol monoisopropyl ether, ethylene glycol monoisobutyl ether, tripropylene glycol monomethyl ether, diethylene glycol methyl ethyl ether, diethylene glycol diethyl ether or the like, as well as glycerol; propylene carbonate; N-methylpyrrolidone; or the like. Examples thereof are not limited thereto. Among these, glycol ethers have a low vapor pressure, and are the most preferable in the preparation process usable for the present invention.

The substrate used in the present invention is not particularly limited, and a polymer film, a glass plate, a metal plate, a peeling or releasing paper or the like can be used therefor. As the substrate, one in which the hydrophilic pore former in the slurry is not dropped from the rear face of the substrate, such as a wire, a filter fabric, a paper filter or the like is preferable. In the case where pores are formed using the hydrophilic pore former, if the hydrophilic pore former is removed from the rear face of the substrate during the drying step, pores cannot be sufficiently formed on the sheet. In addition, the dried sheet has characteristics in that the surface property of the substrate is transferred. For this reason, the surface of the substrate is preferably as smooth as possible. Considering the aforementioned descriptions, a biaxially-drawn polyethylene terephthalate film has flexible properties, and the melting temperature thereof is relatively high. Therefore, effects of stretch or shrinkage during drying can be reduced. Accordingly, this is preferable as a substrate. In addition, the biaxially-drawn polyethylene terephthalate film exhibits higher polarity, as compared with a polypropylene film. For this reason, the film is easily applied even in an aqueous slurry formulation, and can be suitably used.

In the preparation process usable for the present invention, as the method for applying the slurry comprising the cellulose fibers and the cut fibers, and preferably further comprising the hydrophilic pore former, onto the substrate, any means can be used as long as the slurry can be uniformly applied so that the film thickness of the applied layer is within a specified range. For example, the application can be carried out in a pre-metered coater such as a slot die coater, a curtain coater, or the like, or even in an after-metered coater such as an MB coater, an MB reverse coater, a comma coater, or the like.

In the present invention, a surfactant can be added to the slurry as an additive, if necessary. A nonionic surfactant represented by acetylene glycol as a defoamer or a leveling agent can be used in an amount which has no effects on the properties of electrochemical devices. No use of ionic surfactants is preferable since ionic surfactants may affect properties of electrochemical devices.

In the slurry mentioned above, a loading material can be contained in addition to the aforementioned hydrophilic polymer binder and the aforementioned surfactant. For example, an inorganic loading material such as silica particles or alumina particles, an organic loading material such as silicone powders and the like can be used. These particles can be added in an amount which has no effects on the pores of the porous sheet. Use of the particles having an average particle size of less than 2 μm is preferable. If the average particle size is 2 μm or more, pores with a large pore diameter are formed by interspace among the particles, and for this reason, this is not preferable. The aforementioned loading materials have effects of reducing the viscosity of the slurry. For this reason, a concentration of the coating material can be increased, and this is suitable for increasing production efficiency. On the other hand, if an excessive amount thereof is used, strength may be reduced. For this reason, a blending amount thereof which is more than 100 parts by weight with respect to 100 parts by weight of the cellulose fibers is not preferable.

The solvent of the slurry used in the present invention basically needs use of water. For the purpose of improving drying efficiency, a solvent having a higher vapor pressure than that of water, such as an alcohol such as methanol, ethanol or t-butyl alcohol, a ketone such as acetone or methyl ethyl ketone, an ether such as diethyl ether or ethyl methyl ether or the like can be added in an amount of up to 50% by weight of the total amount of the solvent. If the aforementioned solvents are added in an amount of 50% by weight or more, dispersing properties of the cellulose fibers may be impaired, and uniformity of pore distribution may be impaired. For this reason, this is not preferable.

In the preparation process for a porous sheet of the present invention, the aforementioned slurry applied onto the substrate can be dried to obtain a sheet. The drying method is not particularly limited. In particular, a drying method which is commonly used, such as any one or both of drying with hot air and drying with far-infrared radiation, can be used. For example, the temperature of hot air can range from 30° C. to 150° C., and preferably range from 60° C. to 120° C. It is necessary to adjust the temperature of hot air, the amount of hot air, radiation conditions of far-infrared radiation or the like so that the structure in the thickness direction of the sheet is dried as uniformly as possible, under the conditions mentioned above. In addition, in order to improve a drying efficiency, microwave heating can also be used.

In the preparation process for a porous sheet of the present invention, a sheet formed onto the substrate as described above is separated, and thereby, a porous sheet can be obtained. A method of separating a porous sheet from a substrate is not particularly limited.

The preparation process for a porous sheet of the present invention can further have a step of cleaning the aforementioned sheet with an organic solvent. The aforementioned cleaning step is carried out in order to remove components inhibiting performances of the electrochemical device in the case of using a surfactant, if necessary, or smoothly carry out separating the aforementioned sheet from the substrate. The organic solvent is not limited as long as the organic solvent can be used in the cleaning step. A hydrophobic solvent with a reduced solubility with respect to water is preferable in order to avoid effects of shrinkage of the sheet due to movement of the residual moisture to the organic solvent.

With respect to the aforementioned organic solvent, for example, one type or two or more types of organic solvents having a relatively high evaporating rate such as acetone, methyl ethyl ketone, ethyl acetate, n-hexane, toluene, or propanol can be used once or in several divided applications. The usage manner of the organic solvent is not limited thereto. For the purpose of removing a residual pore former, a solvent with high compatibility with water, such as ethanol or methanol is preferable. However, moisture in the sheet move to the solvent or moisture in the air may be absorbed to affect physical properties of the porous sheet or the form of the sheet. For this reason, such a solvent must be used under the conditions in which the moisture amount is controlled. A solvent which is highly hydrophobic such as n-hexane or toluene exhibits poor effects of cleaning the hydrophilic pore former, but it is difficult to absorb moisture. For this reason, such a solvent can be preferably used. From the reasons described above, for example, a method in which cleaning is carried out successively with some solvents, for example, acetone, toluene, and n-hexane in order of gradually increasing the hydrophobic properties of the solvents, and the successive cleaning is repeated to replace the solvent, is preferable.

On the other hand, the laminate of the present invention can be prepared, for example, by the following two methods.

1. Preparation of a Porous Sheet by Cast Coating on a Substrate and Lamination on a Porous Substrate (1) A porous sheet is prepared as described above.

(2) The porous sheet mentioned above is laminated on the porous substrate.

As the porous substrate mentioned above, those already described can be used. In the case where the porous sheet is laminated on the porous substrate, it is possible to simply mount the porous sheet thereon, but it is preferable to join them by bonding means such as adhesive. The adhesive is not particularly limited, but for example, the aforementioned hydrophilic polymer binder and the like can be used.

2. Cast Coating on a Porous Substrate (1) A slurry is coated on the porous substrate. The aforementioned slurry contains cellulose fibers having an average fiber diameter ranging from 20 to 500 nm, cut fibers having an average fiber diameter ranging from 1.5 to 20 μm, and a hydrophilic polymer binder, and the amount of the cut fibers ranges from 1 to 80% by weight based on the total weight of the cellulose fibers and the cut fibers, and the amount of the hydrophilic polymer binder ranges from 5 to 30 parts by weight based on 100 parts by weight of the total weight of the cellulose fibers and the cut fibers. The concentration of the fibers in the slurry is not limited, and it may range, for example, from 1 to 40% by weight, preferably ranges from 5 to 30% by weight, and more preferably ranges from 10 to 20% by weight.

(2) The slurry is dried to form a porous sheet on the porous substrate.

The latter method of preparing a porous sheet by cast coating on a porous substrate may be performed by replacing the "substrate" of the former preparation method with a porous substrate and omitting the step of separating the porous sheet from the "substrate".

In the latter method of preparing a porous sheet by cast coating on a porous substrate, the porous sheet is directly prepared on the porous substrate, and for this reason, the porous sheet and the porous substrate are directly bonded, so that they can be integrated well. On the other hand, in the former preparation method, in which a porous sheet is separately prepared by cast coating on a substrate and the resulting porous sheet is laminated on a porous substrate, a uniform thickness of the porous sheet can be easily obtained, and suppressing the surface roughness can be easily carried out.

[Separator and/or Electrochemical Device]

The porous sheet or the laminate of the present invention can be used as one constitutional element of a separator for an electrochemical device, or can be used as it is, as a separator for an electrochemical device.

The separator for an electrochemical device of the present invention can be used in, for example, a battery such as a lithium ion secondary battery or a polymer lithium battery, as well as a capacitor such as an aluminum electrolytic capacitor, an electrical double-layered capacitor, or a lithium ion capacitor.

The constitution of the aforementioned electrochemical device can be exactly the same as that of a conventional electrochemical device, with the exception of using the porous sheet or the laminate of the present invention as an electrochemical device. The cell structure of the electrochemical device is not particularly limited. As examples thereof, mention may be made of a laminate type, a cylinder type, a square type, a coin type and the like.

For example, a lithium ion secondary battery as the electrochemical device comprising the separator of the present invention has a positive electrode and a negative electrode, between which the aforementioned separator according to the present invention for an electrochemical device is arranged, and the aforementioned separator for an electrochemical device is impregnated with an electrolytic solution.

The aforementioned positive electrode and negative electrode contain electrode active materials. As a positive electrode active material, a conventionally known one can be used. As examples thereof, mention may be made of, for example, a lithium transition metal oxide such as $LiCoO_2$, $LiNiO_2$, or $LiMn_2O_4$; a lithium metal phosphate such as $LiFePO_4$; and the like. As a negative electrode active material, a conventionally known one can be used. As examples thereof, mention may be made of, for example, a carbon material such as graphite; a lithium alloy; and the like. In addition, conventionally known conductive auxiliary materials or binders can be added in the electrodes, if necessary.

For the preparation of a lithium ion secondary battery, first, a positive electrode mixture containing a positive electrode active material and, if necessary, a conventionally known conductive auxiliary material and/or a conventionally known conductive binder, and a negative electrode mixture containing a negative electrode active material and, if necessary, a conventionally known conductive auxiliary material and/or a conventionally known conductive binder, are independently applied on conventionally known collectors. For the collector of the positive electrode, for example, aluminum or the like is used, and for the collector of the negative electrode, copper, nickel, or the like is used. After the positive electrode mixture and the negative electrode mixture are applied onto the collectors, they are dried and subjected to pressure forming. Thereby, a positive electrode in which an active material layer is formed on the collector, and a negative electrode in which an active material layer is formed on the collector can be obtained.

Subsequently, the obtained positive electrode and negative electrode and the separator for an electrochemical device of the present invention are laminated or wound in order of the positive electrode, the separator for an electrochemical device, and the negative electrode to construct a device. Subsequently, the aforementioned device is housed in an exterior material, the collectors are connected to external electrodes, and are impregnated with a conventionally known electrolytic solution. Subsequently, the exterior material is sealed. Thereby, a lithium ion secondary battery can be obtained.

In addition, an electrical double-layered capacitor as the electrochemical device containing the separator of the present invention has a positive electrode and a negative electrode, between which the separator for an electrochemical device of the present invention is arranged, and the aforementioned separator for an electrochemical device is impregnated with an electrolytic solution.

The electrodes of the aforementioned positive electrode and negative electrode can be obtained by, for example, applying an electrode mixture containing activated carbon powder and a conventionally known conductive auxiliary material and/or conventionally known conductive binder onto a conventionally known collector, drying and subjecting to pressure forming. As the collector, for example, aluminum or the like is used.

The electrical double-layered capacitor can be obtained as follows: the positive electrode and negative electrode and the separator for an electrochemical device of the present invention are laminated or wound in order of the positive electrode, the separator for an electrochemical device, and the negative electrode to construct a device. Subsequently, the aforementioned device is housed in an exterior material, and the collectors are connected to external electrodes, and are impregnated with a conventionally known electrolytic solution. Subsequently, the exterior material is sealed.

EXAMPLES

Hereinafter, the present invention is described in detail with reference to Examples and Comparative Examples. It should be understood that the scope of the present invention is not limited to these Examples.

(1) Measurement of Average Fiber Diameter

Five images of fibers were zoomed in a magnification of 5000 times by means of an electron microscope (manufactured by Hitachi, Ltd.), and 20 fibers were optionally selected from each field of view. The fiber diameter thereof was measured and thereby, the measurement of (number) average fiber diameter thereof was carried out.

(2) Measurement of Specific Tear Strength

Figure 1:
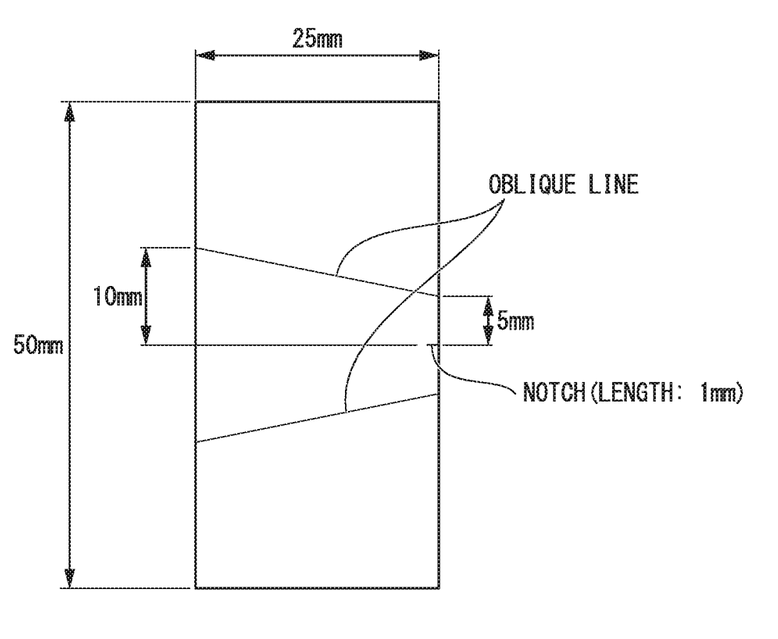
FIG. 1 is a view showing a method for evaluating tear strength in Examples.

A porous sheet was cut into rectangles of 50 mm×25 mm. As shown in FIG. 1, one long side is marked at the upper and lower positions in 5 mm from the center of the long side of the rectangle, the other long side is marked at the upper and lower positions in 10 mm from the center of the long side of the rectangle. The upper marked points were connected with a line, and the lower marked points were connected with another line, so that two oblique lines were put in the rectangle. As shown in FIG. 1, a notch having a length of 1 mm was formed in the center of the long side of the rectangle to which the 5 mm lines were formed. Thereby, a test piece was prepared. The test piece was set on a Tensilon universal tensile tester (RTG-1210, manufactured by A & D Company Limited) in which a distance between chucks was set to 10 mm so that the oblique lines mentioned above were along the lower side of the two chucks of the Tensilon and the long side of the 10 mm-marked side was set to sag. The moving speed of the chuck was set to 5 mm/min, and the test piece was moved in the opposite directions until the moving distance of the chuck reached 11 mm. Thereby, pulling of the test piece was carried out, and the numerical value of the tear strength was measured. Furthermore, the specific tear strength was calculated by dividing the aforementioned value by the basis weight. The specific tear strength was evaluated as being superior (OO) in the case of it being 15.0 mN·m$^2$/g or more, as being passed (O) in the case of it exceeding 10.0 mN·m$^2$/g, and as being failed (x) in the case of it being 10.0 mN·m$^2$/g or less.

(3) Measurement of Tensile Strength

A porous sheet was cut into rectangles of 15 mm×150 mm with the MD direction as the long side to prepare a test piece. The test piece was set on a Tensilon universal tensile tester (RTG-1210, manufactured by A & D Company Limited) in which a distance between chucks was set to 10 mm, and pulling was performed at a constant speed with the moving speed of the chuck being 5 mm/minute. The strength at the time of the sheet being broken was measured to determine the tensile strength. Furthermore, the specific tensile strength was calculated by dividing the aforementioned value by the basis weight. The tensile strength was evaluated as being superior (OO) in the case of it exceeding 3.0 N/15 mm, as being passed (O) in the case of it being 2.0 N/15 mm or more, and as being failed (x) in the case of it being less than 2.0 N/15 mm.

(4) Measurement of Air Permeability Resistance

Air permeability resistance was measured by means of a Gurley type air permeability meter (manufactured by Toyo Seiki Co., Ltd.) in accordance with JIS P 8117, and the value was converted to a value per thickness of 10 μm.

Example 1

NBKP was dispersed in ion-exchanged water so as to have a concentration of 3% by weight. The dispersion was subjected to a refining treatment by cycling under the conditions so that the number average fiber length was 1.0 mm or less, by means of a double disk refiner. The dispersion of the cellulose fibers in which the number average fiber length was 1.0 mm or less was treated ten times by means of a high-pressure homogenizer (manufactured as LAB-1000) under the condition of 800 bar. Thereby, a raw material of microfibrillated cellulose fibers was obtained. The aforementioned raw material was subjected to a treatment using a dehydration machine to have a concentration of about 10% by weight. The raw material of the cellulose fibers was mixed with the equal amount of triethylene glycol butyl methyl ether, and the mixture was dried in an oven at 120° C. to remove the solvent. Subsequently, the average fiber diameter of the fibers was measured by means of an electron microscope. As a result, the average fiber diameter was 280 nm.

With respect to 100 parts by weight of the aforementioned raw material of cellulose fibers, 350 parts by weight of a glycol ether-based pore former (product name: Hisolve DB, manufactured by TOHO Chemical Industry Co., Ltd.), and 10 parts by weight of carboxymethylcellulose (product name: SUNROSE MAC-500 LC, manufactured by Nippon Paper chemicals Co., Ltd.) dissolved in ion-exchanged water to have a concentration of 1% by weight as a hydrophilic polymer binder, were added, and water was added thereto so that a concentration of the solid content of the mixture was finally 2% by weight. Thereby, a coating material was prepared. The coating material was subjected to a dispersion treatment by means of a homomixer (manufactured by AS ONE Corporation) until the mixture was uniformly mixed. Thereby, slurry 1 was prepared.

In addition, with respect to 100 parts by weight of, as cut fibers, polyethylene terephthalate fibers having an average fiber diameter of 3.5 μm and a fiber length of 3 mm (TA04PN, manufactured by Teijin Fiber Co., Ltd.), 10 parts by weight of carboxymethylcellulose (product name: SUNROSE MAC-500 LC, manufactured by Nippon Paper Chemicals Co., Ltd.) dissolved in ion-exchanged water to have a concentration of 1% by weight, as a hydrophilic polymer binder, was added, and water was added thereto so that a concentration of the solid content of the mixture was finally 2% by weight. The mixture was subjected to a dispersion treatment by means of a homomixer until the mixture was uniformly mixed. Thereby, slurry 2 was prepared.

Slurry 1 and slurry 2 were mixed at a weight ratio (fiber base) of 50:50 so that the mixing ratio of the cut fibers was 50% by weight of the total amount of the cellulose fibers and the cut fibers. The mixture was uniformly dispersed at 300 rpm with a stirrer. Thereby, a coating material was prepared.

The prepared coating material was applied onto a PET film having a thickness of 100 μm by means of an applicator so that a WET sheet thickness was 0.30 mm, and subsequently, dried for 12 minutes by means of hot air at 120° C. and an infrared heater. The obtained coating film was separated from the PET film in toluene, and subsequently, the toluene was evaporated therefrom. Thereby, a porous sheet having a film thickness of 16 μm and a basis weight of 5.1 g/m$^2$ was obtained.

Example 2

A coating material was prepared in the same manner as that described in Example 1, with the exception that the mixing weight ratio (based on fibers) of slurry 1 and slurry 2 was 70:30 so that the blending ratio of the cut fibers was 30% by weight based on the total amount of the cellulose fibers and the cut fibers. The coating material was applied on a PET film by means of an applicator so that a thickness of the WET film was 0.30 mm, and subsequently dried with hot air at 120° C. and an infrared heater for 12 minutes. The resulting coating film was separated from the PET film in toluene, and subsequently, the toluene was evaporated therefrom. Thereby, a porous sheet in the form of a cellulose-based fine porous film having a film thickness of 17 μm and a basis weight of 5.2 g/m$^2$ was obtained.

Example 3

A coating material was prepared in the same manner as that described in Example 1, with the exception that the mixing weight ratio (based on fibers) of slurry 1 and slurry 2 was 30:70 so that the blending ratio of the cut fibers was 70% by weight based on the total amount of the cellulose fibers and the cut fibers. The coating material was applied on a PET film by means of an applicator so that a thickness of the WET film was 0.30 mm, and subsequently dried with hot air at 120° C. and an infrared heater for 12 minutes. The resulting coating film was separated from the PET film in toluene, and subsequently, the toluene was evaporated therefrom. Thereby, a porous sheet in the form of an unwoven fabric having a film thickness of 18 μm and a basis weight of 5.0 g/m$^2$ was obtained.

Example 4

A coating material was prepared in the same manner as that described in Example 1, with the exception that the mixing weight ratio (based on fibers) of slurry 1 and slurry 2 was 95:5 so that the blending ratio of the cut fibers was 5% by weight based on the total amount of the cellulose fibers and the cut fibers. The coating material was applied on a PET film by means of an applicator so that a thickness of the WET film was 0.30 mm, and subsequently dried with hot air at 120° C. and an infrared heater for 12 minutes. The resulting coating film was separated from the PET film in toluene, and subsequently, the toluene was evaporated therefrom. Thereby, a non-woven fabric in the form of a cellulose-based fine porous film having a film thickness of 17 μm and a basis weight of 5.0 g/m$^2$ was obtained.

Example 5

A dispersion of polyester fibers was prepared in the same manner as described in Example 1, using polyethylene terephthalate fibers having an average fiber diameter of 8 μm and a fiber length of 3 mm (TA04N, manufactured by Teijin Fiber Co., Ltd.), as cut fibers. Thereby, slurry 3 was prepared. A coating material was prepared in the mixing weight ratio (based on fibers) of slurry 1 and slurry 3 of 70:30 so that the blending ratio of the cut fibers was 30% by weight based on the total amount of the cellulose fibers and the cut fibers. The coating material was applied on a PET film by means of an applicator so that a thickness of the WET film was 0.40 mm, and subsequently dried with hot air at 120° C. and an infrared heater for 12 minutes. The resulting coating film was separated from the PET film in toluene, and subsequently, the toluene was evaporated therefrom. Thereby, a porous sheet in the form of a cellulose-based fine porous film having a film thickness of 21.1 μm and a basis weight of 5.8 g/m$^2$ was obtained.

Example 6

A dispersion of polyester fibers was prepared in the same manner as described in Example 1, using polyethylene terephthalate fibers having an average fiber diameter of 17 μm and a fiber length of 5 mm (TA04N, manufactured by Teijin Fiber Co., Ltd.), as cut fibers. Thereby, slurry 4 was prepared. A coating material was prepared in the mixing weight ratio (based on fibers) of slurry 1 and slurry 4 of 90:10 so that the blending ratio of the cut fibers was 10% by weight based on the total amount of the cellulose fibers and the cut fibers. The coating material was applied on a PET film by means of an applicator so that a thickness of the WET film was 0.40 mm, and subsequently dried with hot air at 120° C. and an infrared heater for 12 minutes. The resulting coating film was separated from the PET film in toluene, and subsequently, the toluene was evaporated therefrom. Thereby, a porous sheet in the form of a cellulose-based fine porous film having a film thickness of 25.5 μm and a basis weight of 5.5 g/m$^2$ was obtained.

Example 7

A dispersion of fibers was prepared in the same manner as described in Example 1, using vinylon fibers having an average fiber diameter of 7.0 μm and a fiber length of 3 mm (VPB041, manufactured by Kuraray Co., Ltd.), as cut fibers. Thereby, slurry 5 was prepared. A coating material was prepared in the mixing weight ratio (based on fibers) of slurry 1 and slurry 5 of 90:10 so that the blending ratio of the cut fibers was 10% by weight based on the total amount of the cellulose fibers and the cut fibers. The coating material was applied on a PET film by means of an applicator so that a thickness of the WET film was 0.40 mm, and subsequently dried with hot air at 120° C. and an infrared heater for 12 minutes. The resulting coating film was separated from the PET film in toluene, and the toluene was evaporated therefrom. Thereby, a porous sheet in the form of a cellulose-based fine porous film having a film thickness of 23 μm and a basis weight of 6.1 g/m² was obtained.

Example 8

With respect to 100 parts by weight, as a raw material, of cellulose fibers, 350 parts by weight of a glycol ether-based pore former (product name: Hisolve DB, manufactured by TOHO Chemical Industry Co., Ltd.), and 25 parts by weight of carboxymethylcellulose (product name: SUNROSE MAC-500 LC, manufactured by Nippon Paper Chemicals Co., Ltd.) dissolved in ion-exchanged water to have a concentration of 1% by weight, as a hydrophilic polymer binder, were added, and water was added thereto so that a concentration of the solid content of the mixture was finally 2% by weight. Thereby, a coating material was prepared. The coating material was subjected to a dispersion treatment by means of a homomixer (manufactured by AS ONE Corporation) until the mixture was uniformly mixed. Thereby, slurry 6 was prepared.

In addition, with respect to 100 parts by weight of polyethylene terephthalate fibers having an average fiber diameter of 3.5 μm and a fiber length of 3 mm (TA04PN, manufactured by Teijin Fiber Co., Ltd.), 25 parts by weight of carboxymethylcellulose (product name: SUNROSE MAC-500 LC, manufactured by Nippon Paper Chemicals Co., Ltd.) dissolved in ion-exchanged water to have a concentration of 1% by weight, as a hydrophilic polymer binder, was added, and water was added thereto so that a concentration of the solid content of the mixture was finally 2% by weight. The mixture was subjected to a dispersion treatment by means of a homomixer until the mixture was uniformly mixed. Thereby, slurry 7 was prepared. Slurry 6 and slurry 7 were mixed at a weight ratio (fiber base) of 50:50 so that the mixing ratio of the cut fibers was 50% by weight of the total amount of the cellulose fibers and the cut fibers. The mixture was uniformly dispersed at 300 rpm with a stirrer. Thereby, a coating material was prepared.

The prepared coating material was applied and dried in the same manner as that described in Example 1. Thereby, a porous sheet having a film thickness of 16 μm and a basis weight of 4.9 g/m² was obtained.

Example 9

100 parts by weight of alumina powder (product name: AKP-3000, manufactured by Sumitomo Chemical Co., Ltd.) as an inorganic filler, 10 parts by weight of a polyimide resin (product name: HPC-1000-28, manufactured by Hitachi Chemical Co., Ltd.) as a binder resin, and 5 parts by weight of carboxymethylcellulose (product name: SUNROSE MAC-500 LC, manufactured by Nippon Paper Chemicals Co., Ltd.) dissolved in ion-exchanged water, were mixed and dispersed in water so that a concentration of the solid content of the mixture was finally 2% by weight. Thereby, slurry 8 was prepared. Slurry 8 was applied on a PET film by means of a wire bar so that a thickness after being dried was 4 μm, and subsequently dried at 120° C. Thereby, an inorganic filler layer was provided. Subsequently, the same coating material as described in Example 1 was applied on the inorganic filler layer by means of an applicator so that a thickness of the WET film was 0.30 mm, and subsequently dried with hot air at 120° C. and an infrared heater for 12 minutes. The resulting coating film was separated from the PET film in toluene, and subsequently, the toluene was evaporated therefrom. Thereby, a porous sheet having a film thickness of 19 μm and a basis weight of 5.6 g/m² was obtained.

Comparative Example 1

A porous sheet in the form of a cellulose fine porous film was obtained in the same manner as described in Example 1, with the exception that the mixing weight ratio (based on fibers) of slurry 1 and slurry 2 was set to 100:0 so that the blending ratio of the cut fibers based on the total amount of the cellulose fibers and the cut fibers was 0%.

Comparative Example 2

A porous sheet in the form of an unwoven fabric was obtained in the same manner as described in Example 1, with the exception that the mixing weight ratio of slurry 1 and slurry 2 was set to 10:90 so that the blending ratio of the cut fibers based on the total amount of the cellulose fibers and the cut fibers was 90%.

Comparative Example 3

With respect to 100 parts by weight, as a raw material, of cellulose fibers, 250 parts by weight of a glycol ether-based pore former (product name: Hisolve DB, manufactured by TOHO Chemical Industry Co., Ltd.) was added, and water was added thereto so that a concentration of the solid content of the mixture was finally 2% by weight. Thereby, a coating material was prepared. The coating material was subjected to a dispersion treatment by means of a homomixer (manufactured by AS ONE Corporation) until the mixture was uniformly mixed. Thereby, slurry 9 was prepared.

In addition, with respect to 100 parts by weight of a polyethylene terephthalate fibers having an average fiber diameter of 8.0 μm and a fiber length of 3 mm (TA04N, manufactured by Teijin Fiber Co., Ltd.) as cut fibers was added, and water was added thereto so that a concentration of the solid content of the mixture was finally 2% by weight. The mixture was subjected to a dispersion treatment by means of a homomixer until the mixture was uniformly mixed. Thereby, slurry 10 was prepared. Slurry 9 and slurry 10 were mixed at a weight ratio (fiber base) of 50:50 so that the mixing ratio of the cut fibers was 50% by weight of the total amount of the cellulose fibers and the cut fibers. The mixture was uniformly stirred at 300 rpm with a stirrer. Thereby, a coating material was prepared.

The prepared coating material was applied and dried in the same manner as that described in Example 1. Thereby, a porous sheet having a film thickness of 23 μm and a basis weight of 4.9 g/m², in which a hydrophilic polymer binder was not added, was obtained.

The air permeability resistance, the specific tear strength, and the tensile strength of the porous sheets according to Examples 1 to 9 and Comparative Examples 1 to 3 were evaluated. The evaluation results of each of the porous sheets are shown in Table 1, together with basis weight and film thickness.

TABLE 1

| | | Basis weight g | Thickness μm | Air permeability resistance second/10 μm | Specific tear strength mN·m²/g | Specific tensile strength N/15 mm |
|---|---|---|---|---|---|---|
| Example | 1 | 5.1 | 16 | 24 | ◯◯ | ◯◯ |
| | 2 | 5.2 | 17 | 16 | ◯◯ | ◯◯ |
| | 3 | 5 | 18 | 14 | ◯◯ | ◯◯ |
| | 4 | 5 | 17 | 16 | ◯◯ | ◯◯ |
| | 5 | 5.8 | 21 | 19 | ◯◯ | ◯◯ |
| | 6 | 5.5 | 25 | 14 | ◯◯ | ◯◯ |
| | 7 | 6.1 | 23 | 16 | ◯◯ | ◯◯ |
| | 8 | 4.9 | 16 | 32 | ◯◯ | ◯◯ |
| | 9 | 5.6 | 19 | 25 | ◯◯ | ◯◯ |
| Comparative Example | 1 | 4.8 | 17 | 16 | X | ◯◯ |
| | 2 | 5 | 20 | 3 | ◯◯ | ◯ |
| | 3 | 4.9 | 23 | 0 | ◯◯ | X |

The porous sheet of Comparative Example 1 did not contain cut fibers, and for this reason, the specific tear strength was lower than the reference value. In addition, the porous sheet of Comparative Example 2, which contained a large amount of cut fibers, exhibited a low air permeability resistance and was unsuitable as a separator for an electrochemical device. In addition, the tensile strength was also decreased. In addition, the porous sheet of Comparative Example 3 containing no hydrophilic binder also exhibited a reduced air permeability resistance, and was not suitable as a separator for an electrochemical device, and the tensile strength was lower than the reference value.

On the other hand, the porous sheets according to Examples 1 to 9 exhibited high air permeability resistance and superior strength characteristics. In particular, both the specific tear strength and the tensile strength were increased.

It can be confirmed from the experiments mentioned above, that use of specific cellulose fibers together with specific cut fibers in specified amounts thereof was able to improve strengths and lithium barrier properties represented by air permeability resistance.

Accordingly, the porous sheets according to the present invention can exhibit a superior performance as a separator for an electrochemical device, as well as superior strengths, in particular, superior in both tear strength and tensile strength.

The invention claimed is:

1. A porous sheet comprising:
cellulose fibers having an average fiber diameter ranging from 20 to 500 nm;
cut fibers having an average fiber diameter ranging from 1.5 to 20 μm; and
a hydrophilic polymer binder,
wherein
an amount of said cellulose fibers is 50% by weight or more and 95% by weight or less based on the total weight of all fibers in the porous sheet,
an amount of said hydrophilic polymer binder is 5 parts by weight or more and 30 parts by weight or less with respect to 100 parts by weight of the total weight of said cellulose fibers and said cut fibers,
said cellulose fibers comprise fibers having a diameter of 1 μm or more in an amount ranging from 5 to 40% by weight based on the total weight of the cellulose fibers, and
said cut fibers have an average fiber length of from 1 mm to 10 mm.

2. The porous sheet according to claim 1, which has a specific tear strength of 15.0 mN·m²/g or more.

3. The porous sheet according to claim 1, which has a tensile strength exceeding 3.0 N/15 mm.

4. The porous sheet according to claim 1, which has a Gurley permeability resistance per 10 μm of thickness of the porous sheet, which is 10 seconds or more and 200 seconds or less.

5. The porous sheet according to claim 1, wherein said cellulose fibers comprise fibers having a diameter of 400 nm or less in an amount of 50% by weight or more based on the total weight of the cellulose fibers.

6. The porous sheet according to claim 1, wherein said cut fibers are selected from the group consisting of polyester fibers, aramid fibers, PPS resin fibers, regenerated cellulose fibers, vinylon fibers, and a combination thereof.

7. The porous sheet according to claim 6, wherein said polyester fibers comprise a polyester selected from the group consisting of polyethylene terephthalate, polybutylene terephthalate, polyethylene naphthalate, and a combination thereof.

8. The porous sheet according to claim 1, which has a porosity ranging from 30 to 70%.

9. The porous sheet according to claim 1, which has a thickness ranging from 3 to 50 μm.

10. The porous sheet according to claim 1, wherein a layer comprising an inorganic filler is further provided on the at least one surface of the porous sheet.

11. A laminate comprising:
a porous substrate; and
the porous sheet as recited in claim 1.

12. The laminate according to claim 11, wherein said porous substrate comprises a woven fabric or a nonwoven fabric.

13. The laminate according to claim 11, wherein said porous substrate comprises cellulose fibers.

14. The laminate according to claim 11, which has a volume resistivity of 1,500 Ω·cm or less determined by alternate current with a frequency of 20 kHz in which the porous membrane is impregnated with a 1 mol/LiPF$_6$/propylene carbonate solution.

15. A separator for an electrochemical device comprising the porous as recited in claim 1.

16. An electrochemical device comprising the separator for an electrochemical device as recited in claim 15.

17. The electrochemical device according to claim 16, which is a battery or a capacitor.

18. A separator for an electrochemical device comprising the laminate as recited in claim 11.

19. An electrochemical device comprising the separator for an electrochemical device as recited in claim 18.

20. The electrochemical device according to claim 19, which is a battery or a capacitor.

* * * * *

UNITED STATES PATENT AND TRADEMARK OFFICE
CERTIFICATE OF CORRECTION

PATENT NO. : 11,236,468 B2
APPLICATION NO. : 16/087519
DATED : February 1, 2022
INVENTOR(S) : Katsuhiko Watanabe et al.

It is certified that error appears in the above-identified patent and that said Letters Patent is hereby corrected as shown below:

In the Claims

Claim 15, at Lines 47 and 48 of Column 30, should read:
15. A separator for an electrochemical device comprising the porous sheet as recited in claim 1.

Signed and Sealed this
Tenth Day of May, 2022

Katherine Kelly Vidal
*Director of the United States Patent and Trademark Office*